(12) United States Patent
Wray

(10) Patent No.: US 7,246,456 B2
(45) Date of Patent: Jul. 24, 2007

(54) LINKED MODE FOR A MULTI-AXIS MACHINE CONTROL

(75) Inventor: Albert Wray, Sidney, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 79 days.

(21) Appl. No.: 10/781,116

(22) Filed: Feb. 18, 2004

(65) Prior Publication Data

US 2005/0194163 A1 Sep. 8, 2005

(51) Int. Cl.
*E02F 5/00* (2006.01)
(52) U.S. Cl. .............................. 37/382; 37/907; 172/4; 172/5
(58) Field of Classification Search ................. 172/4.5; 37/907, 382
See application file for complete search history.

(56) References Cited

U.S. PATENT DOCUMENTS

| | | | | |
|---|---|---|---|---|
| 2,916,836 A | * | 12/1959 | Stewart et al. ............... | 172/4.5 |
| 3,953,145 A | * | 4/1976 | Teach .......................... | 404/84.5 |
| 4,162,708 A | * | 7/1979 | Johnson ....................... | 172/4.5 |
| 4,402,368 A | * | 9/1983 | Moberly ....................... | 172/4.5 |
| 4,807,131 A | * | 2/1989 | Clegg ........................... | 701/50 |
| 5,000,564 A | * | 3/1991 | Ake ........................... | 356/3.16 |
| 5,174,385 A | * | 12/1992 | Shinbo et al. ............... | 172/4.5 |
| 5,235,511 A | * | 8/1993 | Middleton et al. ............ | 701/50 |
| 5,375,663 A | * | 12/1994 | Teach .......................... | 172/4.5 |
| 5,951,612 A | * | 9/1999 | Sahm ........................... | 701/50 |
| 6,068,060 A | * | 5/2000 | Ohtomo et al. ............... | 172/4.5 |
| 6,168,348 B1 | * | 1/2001 | Meyer et al. .................. | 404/90 |
| 6,286,606 B1 | * | 9/2001 | Krieg et al. .................. | 172/4.5 |

* cited by examiner

*Primary Examiner*—Thomas A Beach
(74) *Attorney, Agent, or Firm*—Dinsmore & Shohl LLP

(57) ABSTRACT

A tool control system includes actuators to move the tool, a controller to permit either manual or automatic tool operation, and an output configured to display information pertaining to a position of the tool. In addition, the tool can be moved in either an independent or linked mode, the latter such that during tool operation, both sides of the tool can move substantially in unison with one another, or during system setup, detectors used to ensure coordination with of the tool to a known benchmark can move substantially in unison with one another. The controller can display either single or multiple numbers related to the tool position, and can accept either single or multiple user inputs to move the tool by a user-determined or system-determined amount.

25 Claims, 5 Drawing Sheets

LINKED MODE FOR A MULTI-AXIS MACHINE CONTROL

BACKGROUND OF THE INVENTION

The present invention relates generally to a simplified machine control device, and more particularly to a device that reduces the complexity of the user interface for controlling blade position in earth-grading machinery.

In construction and related earth-moving job sites, an on-site elevation positioning or guidance system can be used in conjunction with earth-grading machinery, such as bulldozers and earthmovers, to provide information about, or control blade lift (also known as grade or elevation) and tilt (also known as slope or side-to-side angle) of, the blade relative to the ground being graded in order to cut and fill earth in accordance with a predetermined grading plan. In "indicate-only" systems, guidance information is provided, whereas in automated systems, the information derived from the differences between the current and desired blade positions can additionally be used to drive the blade to a preferred position. Detectors mounted at locations (typically two) across the blade sense a remotely-generated signal from the system's transmitter, which may generate a horizontally-swept beam (such as a laser) to provide a reference plane. The sensed signals are compared against a predetermined reference to determine if the blade needs to be raised or lowered. Differences between the sensed signals and the reference are used to control the movement of hydraulic valves (or related actuators) coupled to the blade, where the valves are responsive to either user input commands (in manual operation) or to control signals (in automatic operation). An elevation positioning or guidance system that employs equipment for display and control of blade lift and tilt is known as a dual elevation machine control system.

In an independent mode of dual elevation blade control, each side of the blade (or, as typically the case in a bulldozer, one side and the center of the blade) can be autonomously moved, through either of the aforementioned manual or automatic methods. Positions associated with each side are displayed on a screen for viewing by the operator. While the independent mode of control of a single blade (or the control of two blades in the case of a tandem-blade device) of the dual elevation machine control system gives the operator significant flexibility, such as enhanced levels of blade adjustability and concomitant earth grading ability, it also introduces additional complexity into the control system, necessitating additional operator oversight. This is undesirable, requiring the operator to concentrate on monitoring two blade values on the display screen, and inputting two offset values into the controller, thereby necessitating additional input, time and distraction from other operational tasks, even in the majority of operating situations where only a single blade position is being varied.

Accordingly, there exists a need for a mode of operation of a guidance system that maintains the desired blade slope, regardless of elevation changes. There further exists a need for a mode of operation of a guidance system that provides the necessary blade adjustment information, but does so in a way that the amount of data presented to the operator is reduced, thereby simplifying the operator's task.

SUMMARY OF THE INVENTION

The present invention satisfies these needs with a dual elevation machine control system that allows an operator to select conveniently from two elevation control modes. In the first mode, an independent mode, the operator independently adjusts each elevation. The second mode is a linked mode, in which the lift and tilt functions are coordinated together so that actuators controlling both the absolute position of a tool relative to a remote reference, as well as the relative position between various parts of the tool, respond as one.

According to a first aspect of the present invention, a device for moving a blade on an earth-grading machine is disclosed. The device includes a first actuator configured to move a first side of the blade, a second actuator configured to move a second side of the blade and a controller configured to permit either manual or automatic operation of the actuators. It will become apparent from the present context that the term "side", when referring to portions of the blade (or related tools), can refer to any location along the length of the blade; it need not refer only to opposing ends, but could encompass a particular location that is distinguished from another location by virtue of which actuator is predominantly used to determine its position. In this device configuration, the actuators are responsive to the controller to move the blade in a linked mode such that both sides of the blade move substantially in unison with one another. That the actuators are driven in unison means that a single input from the controller or operator is sufficient to send movement instruction to each of the actuators. In addition, components moving "unison" (such as the actuators or the sides of the blade or masts coupled to the actuators) move the same substantial distance; it does not require that the components are coordinated or synchronized to move the same amount at the same instant in time. For example, when the blade is being moved, it is not inconsistent with the present definition of "unison" to have one side finish moving before the other completes its movement.

In the present context, the term "substantially" refers to an arrangement of elements or features that, while in theory would be expected to exhibit exact correspondence or behavior, may, in practice embody something less than exact. As such, the term denotes the degree by which a quantitative value, measurement or other related representation may vary from a stated reference without resulting in a change in the basic function of the subject matter at issue. The controller includes at least one user-operable input mechanism to facilitate manual actuator operation and an information processor to facilitate the automatic operation of the actuators. The device also includes an output configured to display information pertaining to a position of the blade, such as its elevation. Optionally, the output is configured to display a single blade position value. The system may further include a laser guidance apparatus with a signal source configured to provide a reference signal to the controller and a plurality of detectors configured to be in signal communication with the source and the controller. This allows that in either manual or automatic operation, the actuators can move the blade in response to a difference between the detected reference signal and the blade position.

According to another aspect of the present invention, a control system for a machine tool includes a plurality of actuators configured to move the tool, and a guidance apparatus configured to control the actuators. The guidance apparatus includes a signal source, a plurality of detectors configured to be signally coupled to the source, and a controller configured to operate in more than one operational mode. In the present context, the detectors and source are considered to be signally coupled to one another as long as the signal emanating from the source is sensed by the signal-sensing portion of the detector. The detectors are connected to the machine tool, either at opposing ends, one at the end with one at the center, or in any other spaced relationship across the tool, depending on the tool configuration. The controller is made up of at least a data interface coupled to the detectors, at least one user-operable input mechanism, an information processor responsive to the input mechanism and an output configured to display information in either of the plurality of operational modes. When the controller is in a first of the plurality of operational modes, each of the actuators is driven by the controller independently of the other actuators. When in a second operational mode, the plurality of actuators are responsively linked such that they are driven in unison with one another. This is beneficial in that even when at least one of the detectors is no longer signally coupled to the source, the relative position between the ends (or end and center) of the tool remain fixed, thereby avoiding erroneous tool settings. An additional benefit arises in that an operator need only refer to a single tool position displayed on the output when adjustments to the tool position are necessary.

The signal source may be an electromagnetic radiation source, such as a laser. It will be appreciated by those skilled in the art that other signal sources (both electromagnetic and non-electromagnetic) may be used, including sources of visible light, infrared, sonic and ultrasonic energy. The actuators, while being driven in the linked (second) operational mode, together respond to a single input to enable translational tool movement, where the opposing sides (or one side and the center) stay in a fixed vertical relationship relative to one another. In a preferable option, the translational tool movement is along a substantially vertical (i.e., up/down) direction. When operating in the linked mode, the output is configured to display a single elevation number corresponding to the tool's position. In addition to operating in one of the two aforementioned operational modes, the controller can also operate in a setup configuration such that user inputs can be entered into and stored by the information processor, which is preferably a central processor unit (CPU). The information displayed by the output in the first operational mode preferably includes a plurality of numbers corresponding to the elevation of the tool, while the information displayed by the output in the second operational mode preferably includes a single number corresponding to the elevation of the tool. The input mechanism may include a keypad, buttons, switches or related devices for the operator to enter commands. The input mechanism and output are both preferably coupled to the information processor so that information related to commands from the operator and choices displayed on the output are both readily available to the operator. In another option, the guidance apparatus further includes masts connected to the tool, where each mast is also coupled to one of the detectors, thereby capable of maintaining the detector in the signal communication with the signal source. In addition, at least during the second operational mode, the actuators can move the tool in response to a deviation sensed between the detectors and either a laser plane established by the signal source or a user-defined offset that has been input into the controller.

According to another aspect of the invention, a linked mode blade control system includes an guidance apparatus and a plurality of actuators configured to move the blade in response to either signals generated and detected by the guidance apparatus (while the blade is being operated automatically) or a user-defined input (while the blade is being operated manually). The detectors are connected to the blade in a manner similar to that discussed in the previous aspect. As stated previously, in a linked mode of operation, the opposing sides of the blade (or one side and the center of the blade, depending on the coupling between the blade and actuators) are moved together such that the adjustment of the vertical position of one side (or center) of the blade by one of the actuators is replicated at the other side (or center). In other words, the blade moves with a predetermined and unvarying slope (i.e., side-to-side, or angular) orientation throughout the substantial entirety of a blade lift travel path, at least until the operator changes the predetermined orientation. The blade lift travel path is that substantially up and down movement of the blade up to and including its upper and lower travel limits. As before, the guidance apparatus includes a signal source, a plurality of detectors configured to be signally coupled to the source and a controller configured to control the plurality of actuators. Also as previously discussed, the controller includes a data interface coupled to the detectors, at least one user-operable input mechanism and an information processor responsive to the input mechanism. The output is coupled to the controller such that it can display, in the present aspect, information in the linked mode such that the displayed information comprises a single elevation number corresponding to a position of the blade within its lift travel path, rather than displaying information relating to the position of both blade portions (be it right side and center, right side and left side, or other related variations). Optionally, the predetermined slope orientation of the blade is relative to a laser plane established by the signal source or a user-defined offset that has been input into the controller.

According to another aspect of the invention, an earth-grading apparatus includes a blade, an assembly configured to move the blade, and a guidance apparatus cooperating with the assembly. The guidance apparatus is similar to that in the previously-described aspects, and can optionally be a laser source. Also as previously discussed, the actuators each cooperate with separate user inputs in the first operational mode, while together cooperative in a second operational mode to a single user input. In one particular configuration, a first of the actuators is coupled to a right side of the blade, while a second of the actuators is coupled to a left side or center section of the blade. Thus, by way of example, a bulldozer may include an actuator on the right side of the blade, while another could be located at the center of the blade to give the blade center pivoting capability. The dual elevation control allows for either independent or linked actuation of the blade. In yet another version, the single user input is an elevation offset, while the separate user input is an elevation offset to a right side of the blade and an elevation offset to a left side of the blade. The separate user inputs can be used to establish automatic control points, such as the desired finish grade. As discussed in conjunction with at least one of the previous aspects, the guidance apparatus further comprises a plurality of masts mounted to the blade, and further, the masts can be longitudinally spaced along the blade. In the present context, it will be understood that the longitudinal spacing of the blade is along the blade's longest (i.e., widthwise) dimension. In one configuration, a first of the masts is mounted to a right side of the blade, while a second of the masts is coupled to either a left side or center section of the blade, although it will be appreciated that other longitudinal spacings are within the scope of the present disclosure.

According to another aspect of the present invention, a method of operating an earth-grading apparatus is disclosed. In addition to configuring the earth-grading apparatus appropriately, the method comprises the steps of selecting from a plurality of operational modes available in the system, and inputting instructions commensurate with the operational mode into the input mechanism. The earth-grading apparatus includes a blade, an assembly configured to move the blade and a guidance apparatus cooperative with the assembly. Additionally, the guidance apparatus includes a signal source, a plurality of detectors signally coupled to the source and a controller configured to operate in a plurality of operational modes. The controller includes a data interface coupled to the detectors, at least one user-operable input mechanism, an information processor responsive to the input mechanism, and an output configured to display information in either of the plurality of operational modes. A first mode enables each of the actuators to be driven by the controller independently of one another, while a second mode enables the actuators to be responsively linked such that they are driven in unison with one another. As with the previously-described aspects, either the linked or independent modes of operation may be used in conjunction with manual or automatic actuator control. The detectors may be mounted on a mast that facilitates movement of the detector (either manually, or in an automated fashion, such as by electric or hydraulic motor) to keep the detector in signal communication with the signal source, which may be a laser, as previously discussed. The step of selecting may include selecting the second operational mode, also known as the linked mode of operation. When this mode is selected, the following additional steps may also be employed: comparing a reference elevation to a present elevation condition, and operating the blade to effect a change in the area to be graded, where the operating step is based on a desired lift change taken from the compared elevation and entered through the inputting instructions step. Optionally, the method can include additional steps, such as comparing at least one of a laser plane reference elevation established by the laser or a user-defined offset that has been input into the controller to a present elevational position of the blade, determining whether a deviation exists between the present elevational position of the blade and at least one of the reference elevation or the offset, and positioning the blade in response to the deviation. Consistent with the aforementioned automated approach of the system and the controller, the comparing, determining and positioning steps can all be performed automatically.

According to yet another aspect of the invention, a method of benchmarking an earth-grading apparatus to coordinate the position of a blade on the apparatus with that of the requirements of a particular site being graded is disclosed. The apparatus includes a movable blade, actuators to move the blade and a guidance apparatus cooperative with the assembly. The guidance apparatus includes a signal source, a plurality of detectors signally coupled to the source, and a controller configured to control the assembly while operating in at least a linked mode of operation.

Optionally, a mast is coupled to each of the detectors and configured to move the detectors to facilitate signal communication between the detector and the signal source. By way of example, the masts can be movable, and also include motors to translate the corresponding detectors. As previously discussed, in a linked mode of operation, movement of particular components (such as blade actuators, or masts to move the detectors, for example) are responsively linked such that they are driven in unison with one another. By requiring only one control point to be input during the benching process, the linked mode simplifies user operation and promotes consistent, accurate apparatus setup. The method includes the steps of providing a benchmark at a location accessible to the blade, positioning the blade substantially on the benchmark, transmitting a signal with the source, inputting instructions into the input mechanism and receiving the signal with at least one of the detectors until a setpoint is established by at least one of the detectors. In configurations where masts are employed, the detectors can be moved until at least one of them is substantially aligned with the signal to define a substantially on-grade position. In the linked mode of operation, the masts can extend or retract in response to operator input (such as an offset command). Upon receipt of the command, the masts move the detectors until the detectors comply with the input command. In another option, it is the portion of the blade that is substantially underneath one of the detectors that is positioned substantially on the benchmark. As previously described, this portion of the blade corresponds to a particular location that coincides with the placement of the masts and detectors above it, including the blade center, right side or left side. In linked mode, the user inputs are simplified; for example, the inputting of instructions can be something very simple, such as pushing a button to initiate a search for the transmitted signal by at least one of the detectors. This also simplifies output that the user has to consider, where (by way of example) a single reference elevation corresponding to the setpoint (i.e., on-grade) position can be displayed on the output. In this context, the terms "reference elevation" and "setpoint" can be used interchangeably to describe the on-grade position of the detectors to the signal source.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

Figure 1:
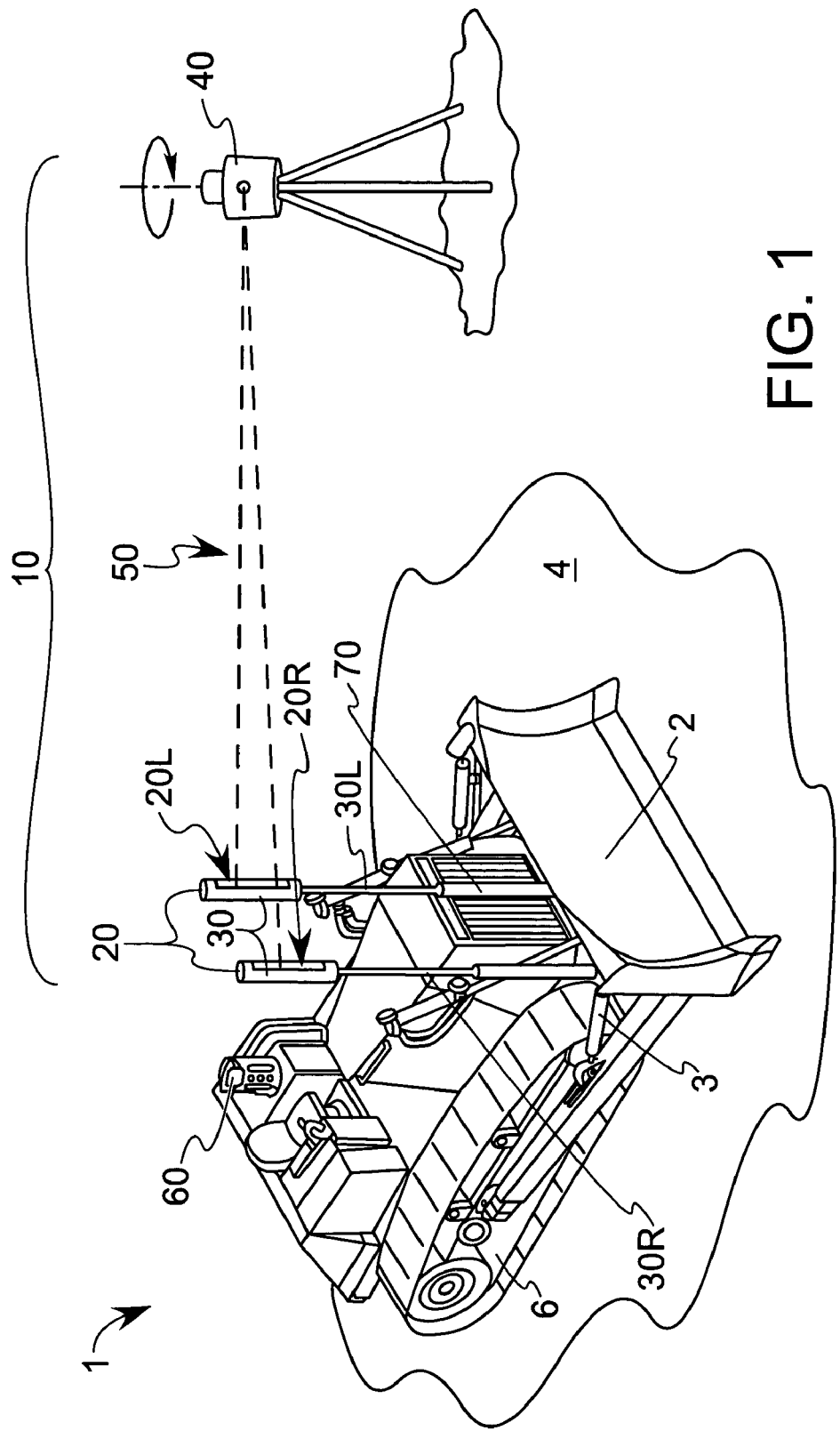
FIG. 1 illustrates a perspective view of earth-grading machinery with a dual machine control system for blade control according to an aspect of the present invention.

FIG. 1 shows an earth-grading machine 1 according to an aspect of the present invention, including a dual laser elevation machine control system 10 used to establish grade and to maintain elevation control for a contouring blade 2 mounted to the machine 1. While shown in its present configuration for use with construction earth-grading machinery 1, control system 10 can also be used with agricultural equipment as well. The control system 10 includes detectors 20 that are mounted to the machine 1 through optional masts 30. It will be understood that subsequent discussion of detectors and their corresponding masts in the general sense will include reference numbers 20 and 30, respectively, and that the references to a left and right detector 20L, 20R and a left and right mast 30L, 30R are made manifest from the drawing. Masts 30L, 30R, which may include telescoping features 70, can be either manually, hydraulically or electrically adjusted, the latter two cooperative with a motor to facilitate automated translational movement of the mast along the vertical axis relative to earth-grading machine 1. Laser transmitter 40 generates a beam 50 that may be swept to define a reference plane, normally several feet above the ground. Detectors 20, essentially 360° omni-directional, detect the laser beam 50 and send elevation information to the controller 60, which is mounted in the cab of earth-grading machine 1. It will be appreciated that some of the functions of controller 60 can be distributed among other components in system 10. For example, system 10 may include a network (not shown) over which laser signals and their deviations can be broadcast, thereby freeing up the controller 60 to dedicate more of its function to passive elevation and status display. Likewise, it will be understood that the essential functions of controller 60 are preserved, regardless of whether it is configured as a distributed or centralized system. In the present configuration, controller 60 is used by the operator as the interface to provide information relating to setup, operation and positioning of the earth-grading machine 1. Detector 20, in conjunction with controller 60, determines the position of the blade 2 relative to the reference plane established by transmitter 40, indicating for example how much the reference plane is above or below the detector 20 location on the masts 30. Actuators 3 on the earth-grading machinery are used to position the blade 2 in response to an operator command or a signal from the controller 60 such that the earth-grading machine 1 can work on ground 4.

As previously mentioned, the linked mode of operation simplifies the operator's task. For example, by having the actuators 3 be responsively linked, they (and the blade 2 coupled to them) can be driven in unison, allowing the relative position of opposing blade sides to be kept constant, even when the blade 2 is being moved. In addition, it was earlier noted that the masts 30 are optional. Thus, in situations where the system 10 includes masts 30, a received input (such as an offset) command via the controller 60 will force the masts 30 to execute the command to move the detectors 20 mounted thereon. As with the movement of blade 2, the masts 30L, 30R can move in unison in the linked mode of operation so that they are responsive to the operator input. When system 10 is set to automatic operation (i.e., the "automatic" controls are enabled) then the actuators 3 drive the blade 2 to a position determined by the entered input in an attempt to keep the sensed detector deviation to a constant value (for example, zero), thereby closing the control loop. Similarly, while operating automatically, the masts 30 (moveable through a coupled motor or the like) can be driven to keep the detectors 20 substantially in their on-grade position. When the system 10 is set to operate manually, the difference between the present position of blade 2 and the desired position is merely displayed, as the actuators 3 will not move the system until the operator exerts a control over the actuators 3 and blade 2. In situations where the system 10 does not include masts 30, then the stationary detectors 20 change their setpoint according to the entered command, where the setpoint is that elevation at which the detectors report an "on-grade" position. In either configuration (i.e., with or without masts 30), the input can be used to change the setpoint (via mast translation or detector setpoint adjustment), resulting in either information (that can be displayed on controller 60) that the operator can subsequently respond to (manual operation), or control signals to move the actuators 3 and blade 2 (automatic operation).

Figure 5:
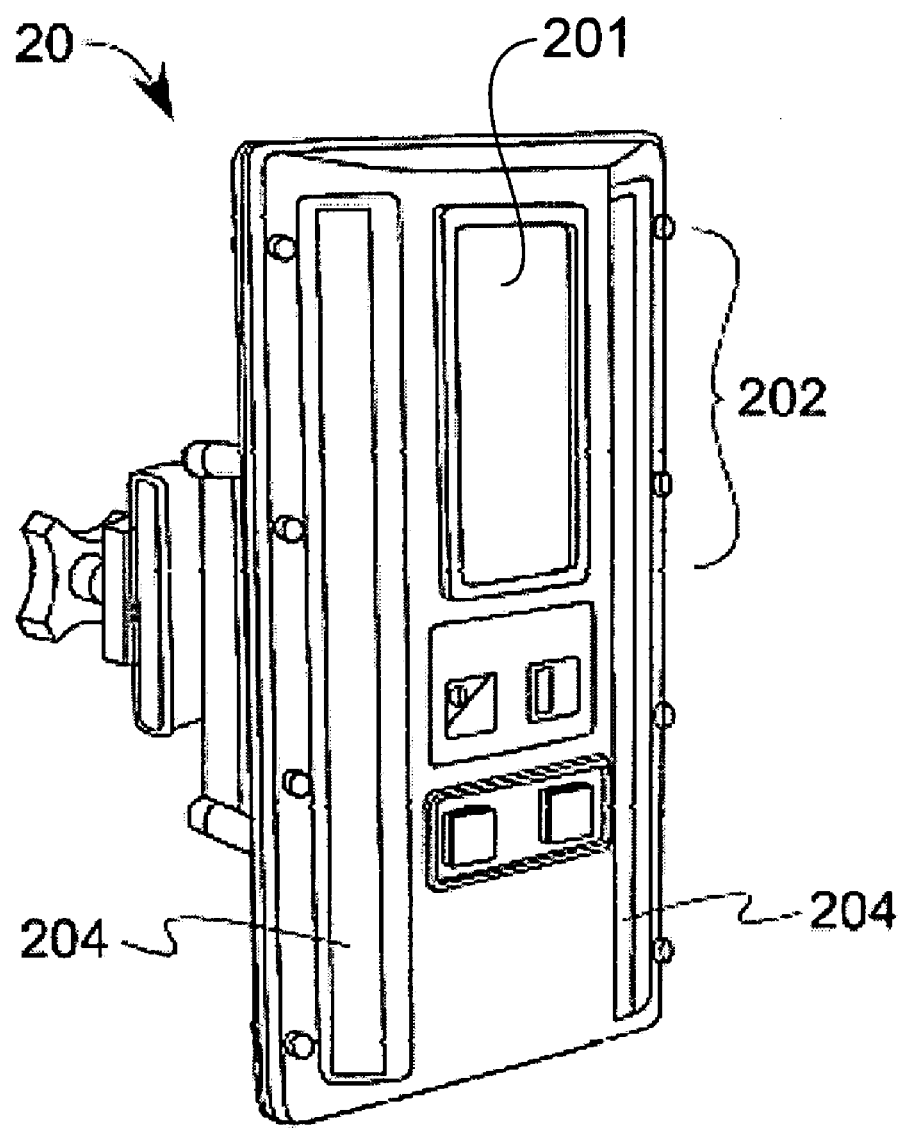
FIG. 5 illustrates the detector.

Referring next to FIG. 5, details of the detector 20 are shown. Detector windows 204 sense signals emanating from transmitter 40. Grade light emitting diodes (LEDs) 201 are configured as arrows on a grade display 202 to indicate when blade 2 of earth-grading machine 1 is above or below grade. The arrows show the direction in which blade 2 has to move to reach the correct elevation. A green line (represented by the dual horizontal LED rows) indicates that blade 2 is on-grade. As previously mentioned, the detectors 20 may be used in a system in which an operator of a bulldozer or other machine manually or automatically moves the blade or related tool. A network adapter (not shown) connects the detector 20 to either mast 30 or a power source on machine 1 via cables (not shown). A quick detach latch (not shown) allows easy detaching of detector 20 from either a rechargeable power pack (not shown) or the network adapter, thus facilitating remote storage of the detectors 20.

Figure 2:
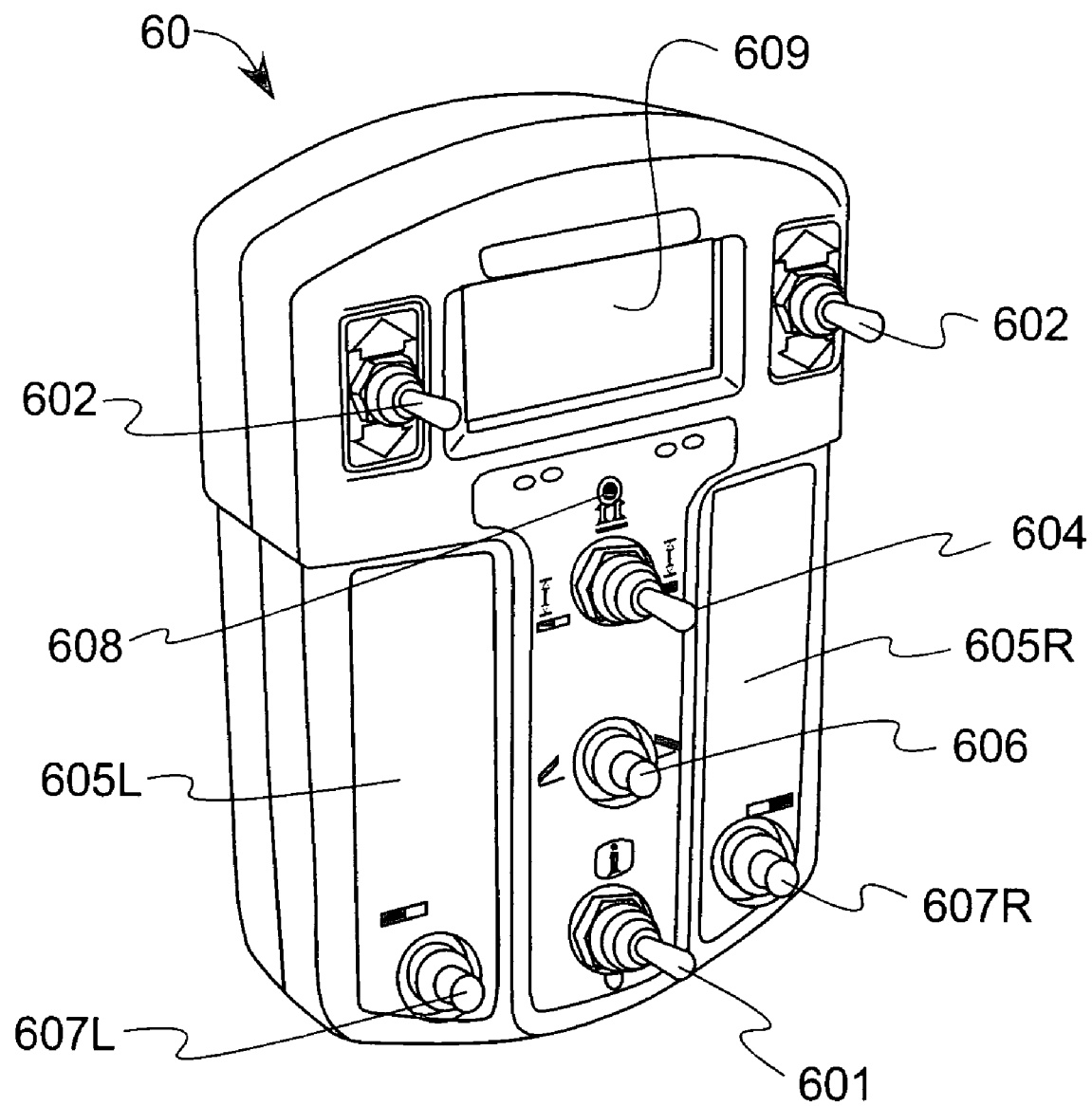
FIG. 2 illustrates the controller, including display screen, LED indicators, and switches.

Referring next to FIG. 2, details of the controller 60 are shown. The controller 60 is based on a central processing unit (CPU) that lets a user set up and operate the system 10 using a combination of input mechanisms (including switches or the like) and output devices (including a display screen and LED indicator lights), all of which will be described in more detail. User-defined and preset values can be saved via memory coupled to the CPU, thus allowing settings that were in use prior to turning the system 10 off to be automatically reloaded when system 10 is turned on again. To turn system 10 on and off, the operator toggles main power switch 601 to the appropriate position. Main power switch 601 can also be toggled to an "information" setting to view and (if necessary) edit various configurational values. When the system 10 is turned on, system software initiates a diagnostic check to determine if all system components are present and are responding correctly. If the system detects any problems, screen 609 indicates the source of the problem. Otherwise, left and right LED grade indicators 605L, 605R light up, indicating that they are functioning. In addition, once the system checks are finished, the saved settings can be made to appear on the screen 609. Controller 60 also includes a controller area network (CAN) interface power connector (not shown) to allow plug-and-play flexibility with the rest of the system 10, thereby facilitating the exchange of data between, for example, the detectors 20 and the controller 60. Controller 60 also includes a remote switch (not shown) to be placed in a convenient position for the operator for performing oft-used functions, including allowing the system 10 to be switched between automatic and manual operation. Controller 60 also includes a serial port that can be used to upgrade or change firmware in controller 60 or any other connected component, or to connect diagnostic equipment for troubleshooting.

Prior to operating the machine 1, it is necessary to bench the system 10 to ensure that the machine 1 is grading to the correct elevation. The point used as a reference is known as a benchmark 5, and the procedure used to set the blade 2 to the same coordinates as the site is known as benching. Blade 2 can be benched in either the linked or independent modes; however, the simplicity inherent in the linked mode ensures that a single command by the operator produces the same elevation offset to both sides of blade 2. In addition, by operating in the linked mode, the operator is only required to bench a single side of the blade 2. Referring next to FIG.

Figure 4:
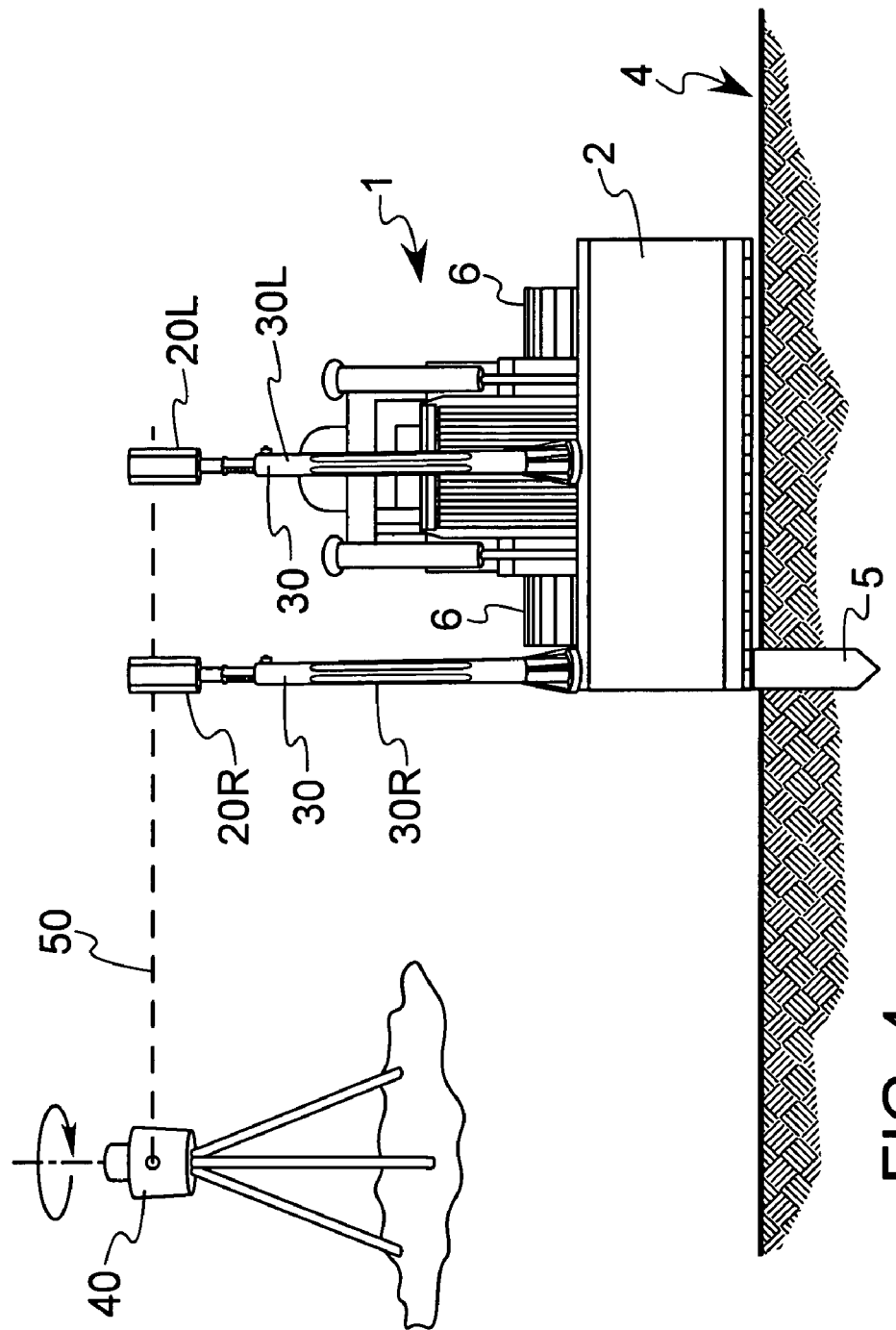
FIG. 4 illustrates a non-angled relationship between the dual machine control system and an earth-grading apparatus, where the earth-grading apparatus can be benched in either the linked mode or the independent elevation mode.

4 in conjunction with FIGS. 1 and 2, the machine 1 is preferably benched with the blade 2 of the machine 1 in the normal working position. That is, the blade 2 is on the ground 4 and the blade 2 is level with the tracks 6 of the machine 1. With the system 10 turned on, the operator levels blade 2, placing the portion of the blade that is underneath the corresponding detector 20 and mast 30 being benched on benchmark 5, taking special care to ensure that the benchmark 5 is not moved during this period. By way of example, one of the benching points is placed under the center of the blade 2, while the other is under the right corner of the blade 2 (as shown in the figure), although it will be appreciated by those skilled in the art that other locations (such as under the left corner of the blade) can also be used. By pressing one of the left or right reset buttons 607L or 607R, the operator initiates search for laser beam 50 by detectors 20, stopping when the appropriate laser detector 20L, 20R either moves to an on-grade position (in configurations employing masts 30L, 30R) or registers the location on display window 204 upon which the signal emanating from transmitter 40 strikes (in configurations where no masts are employed), thereby establishing the reference elevation and on-grade setpoint for blade 2. The reference elevation is the numerical value applied to the elevation associated with the benchmark 5. This process is called auto-benching, and both masts 30 (when configured as electric masts) move automatically until the detectors 20 that are being auto-benched are on-grade. For optimum system performance, it is preferable (although not necessary) to have both detectors 20 on-grade. This occurs when the cutting edge of blade 2 is parallel to laser beam 50, as shown in FIG. 4. Once the reference elevation has been established, it can be recorded into controller 60. Other operating parameters besides the reference elevation can be highlighted and edited as well. For example, valve speed, operating mode, elevation offset, on-grade deadband, audio volume and various system diagnostics items can all be adjusted.

One additional menu category, the "linked elevation adjustment" menu item, can be used to calibrate or otherwise fine tune the tilt of blade 2 (if required) while the system 10 is in the linked elevation mode. This calibration may be necessary in situations where the masts are vertically misaligned. Such misalignment can be due, for example, to non-rectangular blade shape or other impediments to mounting the masts 30 in the same horizontal plane. In this circumstance, the controller 60 can be used to store the elevation difference (referred to as elevation sensor offset) between the two masts 30L, 30R. With this information stored, the system will then always maintain the same offset between the measurements reported by the two detectors 20, thereby ensuring that when the operator changes system elevation via single value, the blade 2 will always remain parallel to the laser plane formed by laser beam 50 while the system is in automatic mode. In the alternate, this calibration feature can be used to program in an artificial angle or slope into system 10. The calibration flexibility is also valuable in situations where there may be incorrect blade tilt (which may arise from uneven blade wear); in such circumstances, the amount of error can be entered into the "linked elevation adjustment" option to compensate for the discrepancy. Typically, an operator can detect blade tilt error by first cutting a pass to grade, then turn machine 1 in the opposite direction, then check to see if the blade is still parallel to the grade. To enter the linked elevation adjustment, the operator first turns the main power switch 601 to the "information" position, then toggles the position/scroll switch 602 until the "linked elevation adjustment" option is highlighted on screen 609. Next, the operator presses the reset button 607R, which causes the "linked elevation adjustment" screen (not shown) to appear, displaying the number 0.000 at the outset. The operator can then enter a positive value to lift one side of blade 2 or enter a negative value to lower that side.

Figure 3A:
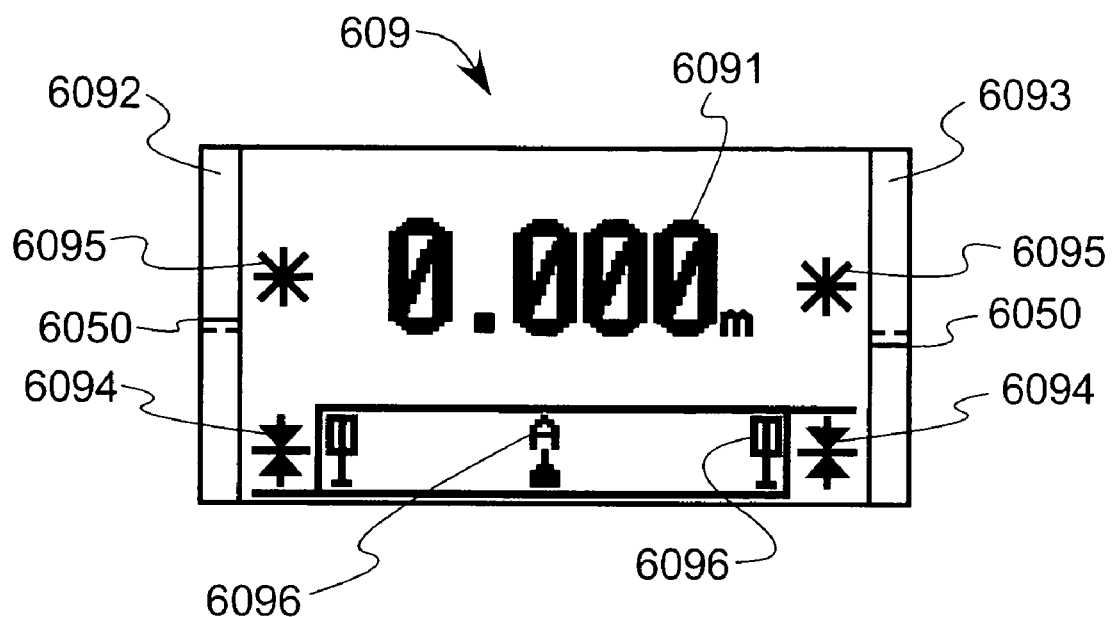
FIG. 3A illustrates a detailed view of the screen of FIG. 2, showing some of the icons and user interface information displayed when the system is in the linked mode of operation.
Figure 3B:
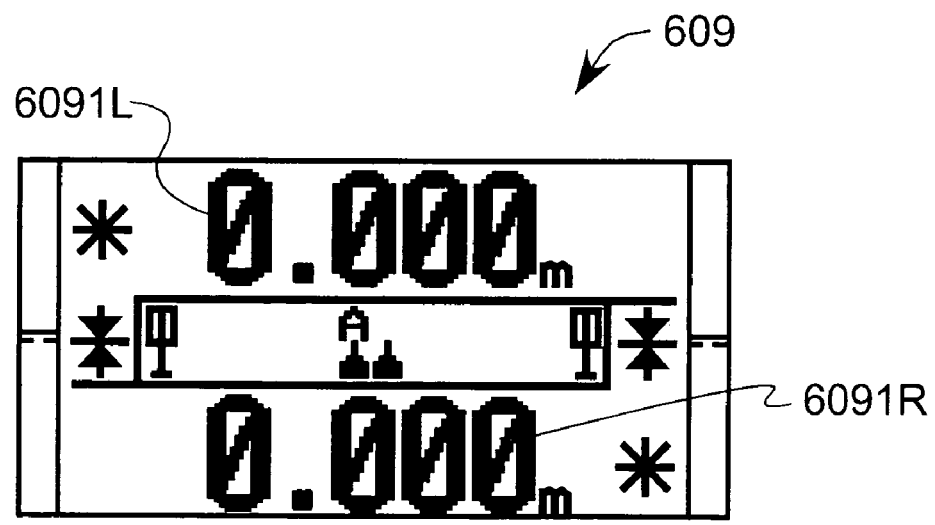
FIG. 3B illustrates the display of left and right reference elevations for the blade when the system is in the independent elevation mode of operation.

Once system 10 has been benched, it is ready to be used with earth-grading machinery 1 are shown and described. Referring next to FIGS. 3A and 3B in conjunction with FIG. 2, particular features of the screen 609 that can be displayed for linked and independent modes of operation respectively, are shown. In linked mode, screen 609 similar to the one shown in FIG. 3A appears. Left laser detector strike window 6092 diagrammatically represents the left detector 20L, showing where the on-grade setpoint is (in the form of a pair of generally horizontal, inwardly-facing notches at the vertical halfway point of window 6092) and the position of the detected laser plane (in the form of a generally horizontal bar 6050 of window 6092). Right laser detector strike window 6093 diagrammatically represents the same information for the right detector 20R; strike windows 6092, 6093, in conjunction with the on-grade setpoint provide readily apparent indicia of the blade's present deviation from the setpoint. For example, if the laser beam 50 strikes above the on-grade position of detector 20, this means that blade 2 is below the present grade. Much of the information shown on screen 609 is represented using icons. For example, device status icons 6096 show the status of the devices that are used by system 10.

Referring with particularity to FIG. 3B, the independent elevation mode (which can be run either manually or automatically) can also be used to bench and set the reference elevation for each mast 30L, 30R independently. Screen 609 shows numeric output corresponding to the left and right reference elevations 6091L, 6091R that are being worked to. When operating manually, the operator can toggle the position/scroll switch 602 to move the appropriate mast 30L, 30R up or down, thereby getting the corresponding detector 20L, 20R on-grade (for benching) or applying elevation offset only to the desired side of blade 2 during operation. The control mode switch 604 is active in independent elevation mode such that when toggled to the center position, both sides of earth-grading machine 1 can use automatic or manual mode together. Similarly, when toggled to the left position, the left side of machine 1 uses automatic or manual mode, while the right side is always in manual mode. Likewise, when toggled to the right position, the right side of the machine uses automatic or manual mode, with the left side always in manual mode. To enter an elevation offset to the reference elevation, the operator toggles position/scroll switches 602 or the elevation offset remote switch. The operator can then press the auto/manual remote button to set the automatic movement of blade 2 to grade, where such condition can be indicated by the aforementioned grade LEDs 605L, 605R, which may include colored arrows to indicate when the cutting edge of blade 2 is above or below grade. The operator also has the option of turning off the automatic condition by pressing the auto/manual remote button to the manual condition. While in the independent elevation mode, the previously-discussed "linked elevation adjustment" option in the configuration menu is not available.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A linked mode control system for a machine tool, said system comprising:
a signal source;
a plurality of detectors configured to be in signal communication with said signal source such that an on-grade reference elevation is established in said plurality of detectors;
a controller configured such that upon application of an offset elevation that deviates from said on-grade reference elevation, said controller maintains a substantially constant vertical distance between a cutting edge of said machine tool and a position of said plurality of detectors that corresponds to said on-grade reference elevation, said controller comprising:
a data interface coupled to said plurality of detectors;
at least one user-operable input mechanism;
an information processor responsive to said input mechanism and said plurality of detectors, said information processor configured to instruct operation of said plurality of detectors; and
a linked mode output configured to display a single elevation value corresponding to a position of said machine tool as sensed by said plurality of detectors.

2. The device according to claim 1, said controller further comprising:
at least one user-operable input mechanism to facilitate manual operation of said plurality of detectors; and
an information processor configured to instruct operation of said plurality of detectors.

3. The control system according to claim 1, wherein said signal source is an electromagnetic radiation source.

4. The control system according to claim 3, wherein said electromagnetic radiation source is a laser source.

5. The control system according to claim 1, wherein said plurality of detectors are movably mounted to said machine tool.

6. The control system according to claim 1, wherein said information processor is CPU-based.

7. The control system according to claim 5, further comprising a plurality of masts connected to said tool, each said mast coupled to one of said detectors and configured to allow the application of an offset to said on-grade reference elevation.

8. The control system according to claim 1, wherein said at least one elevation value corresponding to a position of said machine tool as sensed by at least one of said plurality of detectors comprises at least one of said deviation or said on-grade reference elevation.

9. The control system according to claim 1, wherein said controller is further configured that upon the presence of said deviation, said controller instructs at least one actuator to move said machine tool.

10. A linked mode control system that is responsive to a signal emanating from a signal source, said system configured for use with a machine tool, said system comprising:
a first mast mounted to said machine tool, said first mast comprising a first detector disposed thereon, said first detector configured to receive a reference elevation signal from a signal source;
a second mast mounted to said machine tool, said second mast comprising a second detector disposed thereon, said second detector configured to receive said reference elevation signal from said signal source, said second detector spaced apart from said first detector along a length of said machine tool;
a controller configured to receive signals from said first and second detectors while said system is operating in said linked mode, said controller configured to maintain a substantially constant vertical distance between a cutting edge of said blade and said on-grade reference elevation of said first and second detectors while said system is in said linked mode; and
an output responsive to said controller and configured to display information such that no more than a single elevation value corresponding to a position of one of said detectors or said machine tool is displayed while said system is in said linked mode.

11. The system of claim 10, wherein said first and second detectors are moveably mounted to said masts.

12. An earth-grading apparatus comprising:
a blade;
an assembly configured to move said blade; and
a guidance apparatus cooperative with said assembly, said guidance apparatus comprising:
a signal source;
a plurality of detectors configured to be in signal communication with said signal source such that a signal emanating therefrom is sensed as an on-grade reference elevation by at least one of said plurality of detectors;
a controller configured to control said assembly while operating in a plurality of operational modes, said controller signally coupled to at least one of said plurality of detectors such that said controller can maintain a substantially constant vertical distance between a cutting edge of said blade and said on-grade reference elevation of said plurality of detectors while said system is in said a linked mede mode of plurality of operational modes; and
an output cooperative with said controller such that upon receipt of a signal corresponding to a linked mode position of said plurality of detectors, said output displays no more than a single blade elevation value.

13. The apparatus according to claim 12, wherein said signal source is a laser source.

14. The apparatus according to claim 12, wherein said plurality of detectors are together responsive to a single user input into said input mechanism.

15. The apparatus according to claim 14, wherein said single user input is an elevation offset.

16. The apparatus according to claim 12, wherein said guidance apparatus further comprises a plurality of masts mounted to said blade, each said mast coupled to one of said plurality of detectors and configured to allow the application of an elevation offset to said on-grade reference elevation.

17. The apparatus according to claim 16, wherein said masts are spaced along a longitudinal dimension of said blade.

18. The apparatus according to claim 17, wherein a first of said masts is mounted to one side of said blade, and where a second of said masts is coupled to either an opposite side or center section of said blade.

19. A device for establishing a linked mode of operation for a blade on an earth-moving machine, said device comprising:
a signal source configured to establish an on-grade reference elevation;
a plurality of detectors coupled to said earth-moving machine, said plurality of detectors configured to be in signal communication with said signal source such that at least said on-grade reference elevation is sensed by said plurality of detectors;

a controller signally cooperative with at least one of said plurality of detectors such that upon application of an offset in said linked mode, said controller maintains a substantially constant vertical distance between a cutting edge of said blade and said on-grade reference elevation of said plurality of detectors; and an output signally cooperative with said controller such that upon receipt of a signal corresponding to a linked mode position of said plurality of detectors, said output displays a single blade elevation value.

20. The device according to claim 19, wherein said controller is further configured to permit either manual or automatic operation of said plurality of detectors.

21. The device according to claim 19, wherein said signal source is a laser source.

22. The device of claim 19, wherein said plurality of detectors are moveable in response to an applied offset such that after said application of said offset, said system operates to maintain a substantially on-grade elevation of at least one of said plurality of said detectors.

23. The device of claim 22, wherein elevation of said blade is moveably responsive to said maintenance of said substantially on-grade elevation of at least one of said plurality of said detectors.

24. The system according to claim 10, said controller further comprising:

a data interface coupled to said detectors;

at least one user-operable input mechanism; and an information processor responsive to said input mechanism and said reference elevation signals received from said first and second detectors, said information processor configured to instruct operation of said first and second detectors.

25. The device of claim 19, wherein said plurality of detectors are stationary relative to said machine tool.

* * * * *

UNITED STATES PATENT AND TRADEMARK OFFICE
CERTIFICATE OF CORRECTION

| | | |
|---|---|---|
| PATENT NO. | : 7,246,456 B2 | Page 1 of 1 |
| APPLICATION NO. | : 10/781116 | |
| DATED | : July 24, 2007 | |
| INVENTOR(S) | : Albert Wray | |

It is certified that error appears in the above-identified patent and that said Letters Patent is hereby corrected as shown below:

Col. 12, line 35, "linked mede mode of plurality" should read --linked mode of said plurality--

Signed and Sealed this

Fifteenth Day of April, 2008

JON W. DUDAS
*Director of the United States Patent and Trademark Office*